United States Patent

[11] 3,570,803

| [72] | Inventors | Ray W. Cokeley<br>3000 Broadway, Oakland, Calif. 94611;<br>David Y. Milburn, 14 Francisco Court,<br>Orinda, Calif. 94563 |
|---|---|---|
| [21] | Appl. No. | 783,845 |
| [22] | Filed | Dec. 16, 1968 |
| [45] | Patented | Mar. 16, 1971 |

[54] CORROSIVE PROOF PINCH TUBE VALVE
2 Claims, 7 Drawing Figs.

[52] U.S. Cl. .................................................. 251/7,
251/143, 251/254
[51] Int. Cl. ........................................................ F16k 7/06
[50] Field of Search ...................................... 24/(Inquired);
222/529; 251/4—10, 238—241,
253, 254; 285/239, 250

[56] References Cited
UNITED STATES PATENTS

| 1,467,004 | 9/1923 | Landers......................... | 251/254 |
| 2,446,620 | 8/1948 | Swallow et al. ............... | 251/5x |
| 3,012,701 | 12/1961 | Weber........................... | 251/7x |
| 3,220,652 | 11/1965 | Cape ............................ | 251/7x |

Primary Examiner—William F. O'Dea
Assistant Examiner—Richard Gerard
Attorney—Milmore & Cypher ABSTRACT: A valve for corrosive fluids consisting of a housing through which passes a flexible tube, a valve seat positioned in the housing passage having a convex striking surface, a plunger mounted on the housing having a plunger head movable toward and away from the valve seat, adjustable means adjusting the closure distance between the plunger head and the seat and manually engageable means connected to the plunger for operating the closure of the tube.

PATENTED MAR 16 1971

INVENTORS
Ray W. Cokeley
David Y. Milburn
BY
Milmore + Cypher
Attorneys

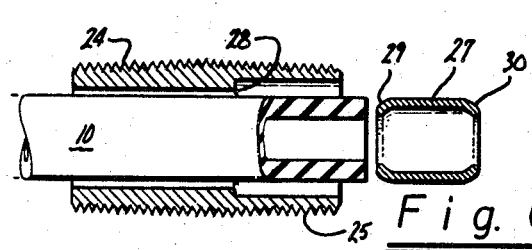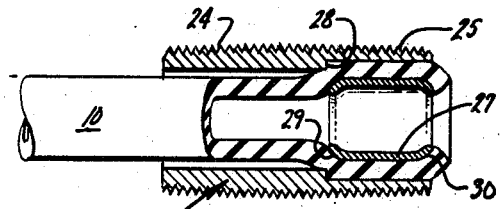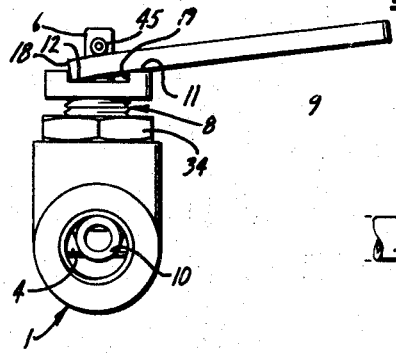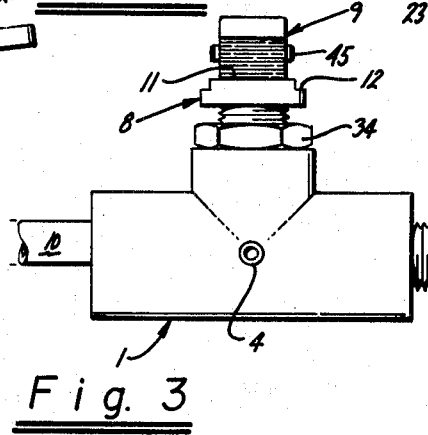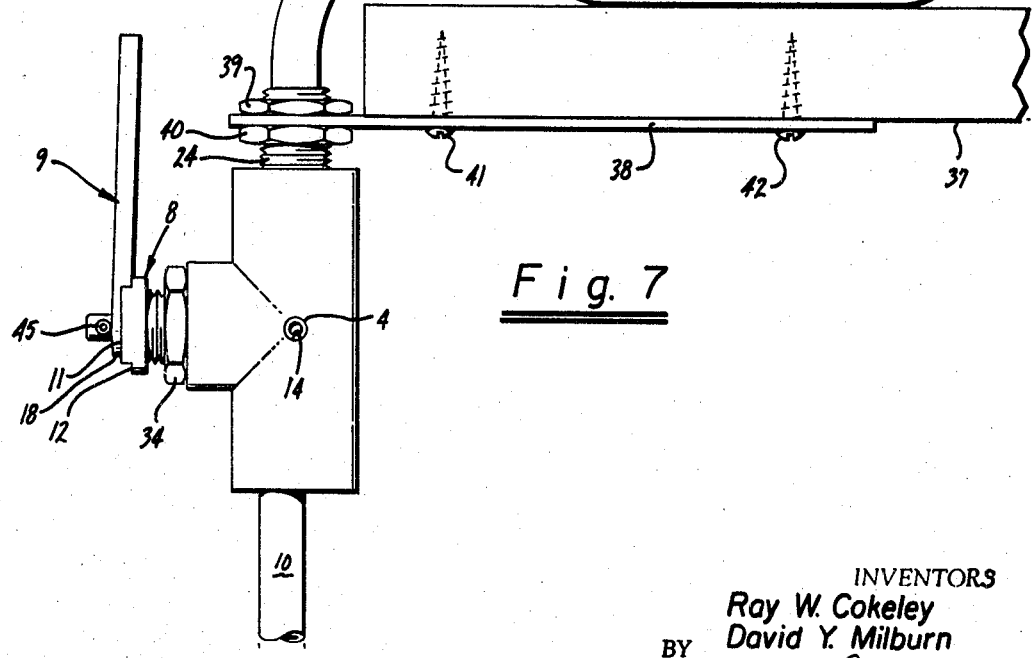

CORROSIVE PROOF PINCH TUBE VALVE

BACKGROUND OF THE INVENTION

Highly corrosive fluids, gas or liquid, are frequently handled in relatively small quantities and dispensed through flexible tubes. Many applications of the use of corrosive fluids occur in laboratories where it is necessary to meter out exact quantities. At the present time, there is no satisfactory noncorrosive valve commercially available.

SUMMARY OF THE INVENTION

The gist of the present invention is the use of a valve which never comes in contact with the corrosive fluid to be valved, but instead operates only on the flexible tubing through which the fluid moves. Since tubing comes in many sizes, it is a feature of the present invention that the valve assembly is such that it is adjustable and capable of handling various sizes of tubing. Accordingly it is an object of the present invention to provide a valve which is easily and quickly adaptable to the valving of various size flexible tubing. It is a further object to provide a valve which may be positioned and easily repositioned at any point along a flexible tube. Still another object is to provide a valve which is normally in the closed position to prevent accidental spilling of corrosive fluids. A further object is to provide a valve as previously described which is inexpensive to manufacture, of durable construction and requires little or no maintenance.

BRIEF DESCRIPTION OF THE DRAWINGS

FIG. 3 is an end elevation view of an alternative form of the invention with parts cut away for clarity of understanding.

FIG. 4 is an end elevation view of the valve shown in FIG. 3.

FIG. 5 is an enlarged partial cross-sectional view of another form of a portion of the invention.

FIG. 6 is an exploded cross-sectional view of the device as shown in FIG. 5.

FIG. 7 is a side elevation view of the device shown in a typical use of the invention.

DESCRIPTION OF THE PREFERRED EMBODIMENTS OF THE INVENTION

Figure 1:
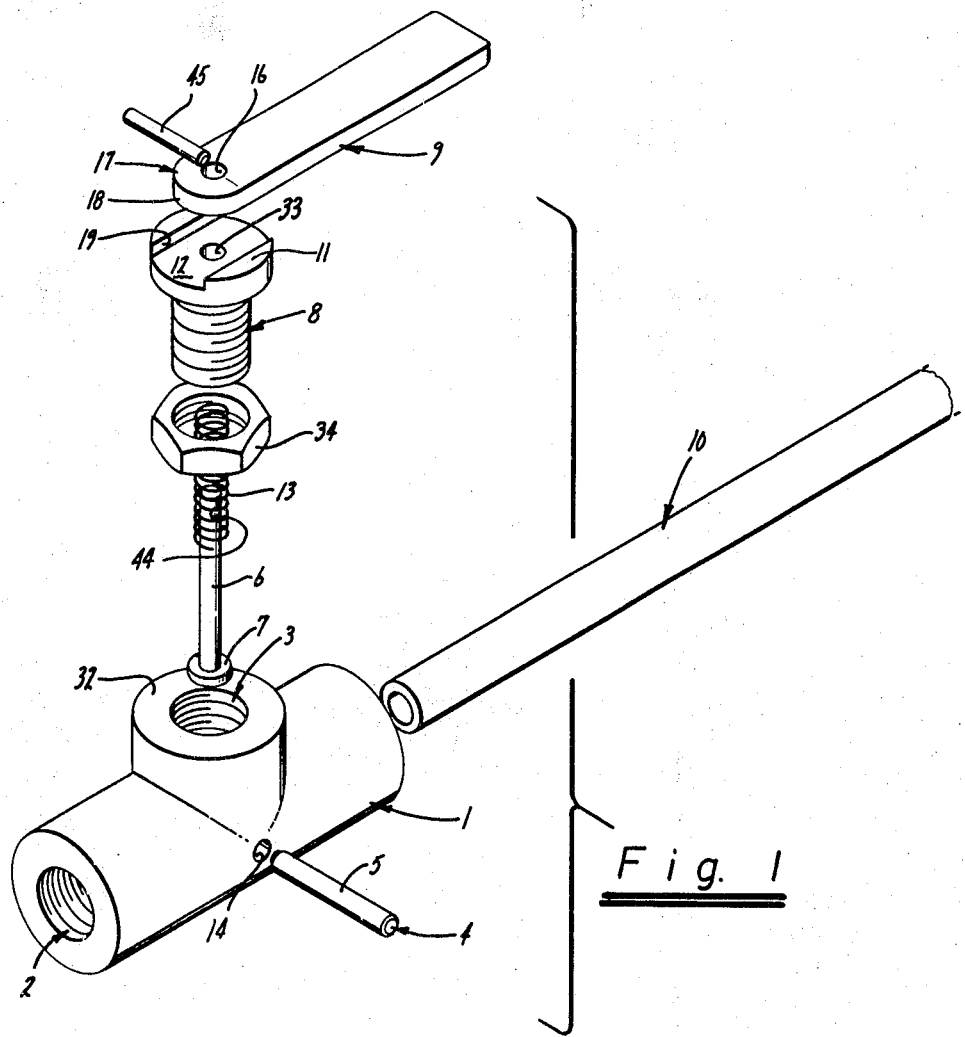
FIG. 1 is an exploded perspective view of the valve constructed in accordance with the present invention.

The valve of the present invention consists briefly of a housing 1 having a passage 2 therethrough and an opening 3 intermediate the ends of the passage intersecting the passage; a valve seat 4 positioned in the passage having a convex striking surface 5; a plunger mounted on the housing having a plunger head 7 moving in a reciprocating path through the housing opening toward and away from the striking surface; means 8 for adjusting the closest distance which said plunger can come to the striking surface; manually engageable means 9 connected to the plunger for reciprocation thereof; and flexible conduit means 10 axially mounted in the passage and passing between the valve seat and the plunger head so as to be constricted by the movement of the plunger.

The valve parts thus named may be made of plastic or metal since none of the valve parts come in direct contact with the corrosive fluid except the flexible tube which is preferably made of Tygon or Neoprene tubing.

One of the unique features of the present invention is the operation of the valve in which the manually engageable means includes a manually engageable cam follower and a cam surface 11 and 12 disposed to engage the cam follower in at least two positions. When the cam follower or lever 9 mates with surface 12, the valve is in the closed position. When the lever mates with surface 11 the valve is in the open position.

Preferably the valve is constructed with a spring 13 which biases the plunger to the fully closed position in a snap shut manner. The plunger head serves as one of the spring retainers and the member 8 serves as the fixed side of the spring retainer.

Figure 2:
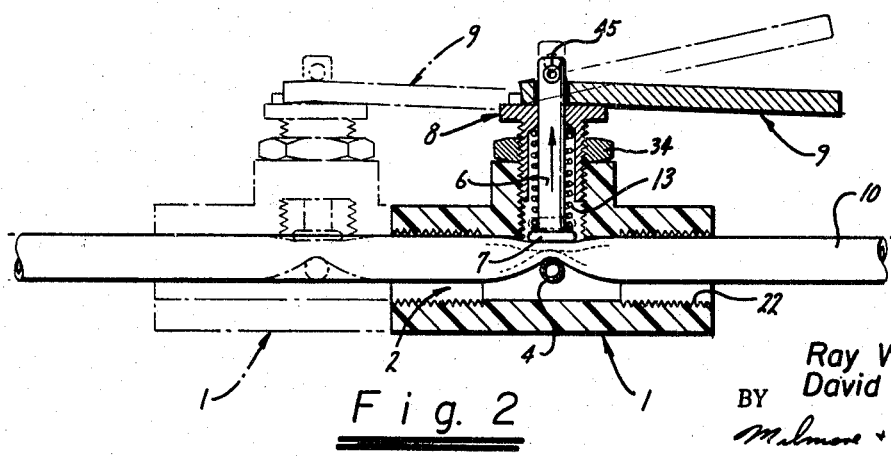
FIG. 2 is a cross-sectional view of the device shown in FIG. 1; the phantom lines showing the movement of the valve handle and the movement of the entire valve along the flexible tubing.

One very important feature of the present invention is its extreme simplicity. As an example, the valve seat which is usually a carefully dimensioned portion of any valve with close tolerances, is one of the simplest parts of the present valve. It may merely be a pin positioned in an opening 14 in the side of the housing transverse to and intersecting the passage. If need be, several openings may be made in the housing to accommodate various size tubes. The pin is of course positioned so that the plunger head will drive the tube into squeezing engagement as shown in FIG. 2. The seat could be formed in the housing itself but however accomplished, best results are obtained by providing a convex striking surface.

The manually engageable means may be a knob but it has been found that an elongated lever arm is most convenient and it is formed with an opening 16 therethrough for receiving the plunger. The end of the lever 17 which bears against the cam face is formed with a bend as shown in FIG. 4 to increase the leverage and the travel of the plunger for opening and closing. It should be further noted that the face 18 of the lever arm is parallel to the face 19 in the cam surface.

For valving corrosive gases wherein the valve is to be connected to a threaded pipe 21 as shown in FIG. 3, a special adapter is employed which is further shown in FIGS. 5 and 6. One end of the passage is threaded as shown in FIG. 2 with pipe threads 22. A connecting member 23 having external pipe threads 24 and 25 is threaded into the housing as shown in FIG. 3. The conduit is pushed through the valve and the connector and then a bushing 27 having an outside diameter greater than the inside diameter of the conduit is forced inside the conduit so as to force it into sealing engagement with the walls of the connector. Thus any corrosive gases are prevented from entering the valve from the connection with the pipe 21 through the connector between the outer wall of the flexible conduit and the inner wall of the connector. To prevent the bushing from being forced into the valve, the connector may be formed with a shoulder 28 so that a mechanical grip is formed with the flexible conduit. To prevent cutting of the flexible conduit, the ends of the bushing 29 and 30 are rounded.

The means for adjusting the closest distance which the plunger can come to the striking surface includes a threaded opening rimmed by a stop surface 32, a threaded member 8 carrying the cam surface for threaded receipt in the opening and an opening 33 for receiving the plunger and a lock nut 34 threaded for receipt on the threaded member 8 movable into engagement with the stop surface on the housing.

In FIG. 8, the valve is shown in use with a corrosive liquid container 36 setting on a laboratory desk top 37. A bracket member 38 having an opening therein for receiving the connecting member 24 is connected to the valve by a pair of threaded nuts 39 and 40, and is connected to the laboratory table by screws 41 and 42.

The construction of the valve permits the lever arm to be positioned for operation at any point on a 360° circle. This is made possible by forming a opening 44 in the plunger and inserting a pin 45 straddling the lever arm.

A major feature of the valve is the fact that it can be positioned at any point along the flexible conduit. In order to hold the valve in a given position the pin 4 is mounted in the housing so as to pinch the flexible conduit between the housing and the pin as shown in FIG. 2.

In operation, a length of tubing is inserted through the passage in the housing with the tube being positioned between the seat and the plunger head. The threaded adjustable member is then turned until the desired amount of initial pressure is placed on the tubing by the plunger head so that the tube is pinched closed. The lock nut is then turned until firm against the stop face on the housing. The member can be turned slightly to position the lever arm in a convenient position for operation.

To open the valve, the lever arm is lifted and rotated until it rests upon the upper cam face. To close, the lever arm is rotated until it is in alignment with the lower cam face. The spring will bias the plunger to the closed position.

We claim:

1. A valve for corrosive fluids comprising:
   a. a housing having a passage therethrough and an opening intermediate the ends of said passage intersecting said passage;
   b. valve seat means positioned in said passage having a convex striking surface;
   c. a plunger having an opening in the end thereof and mounted on said housing having a plunger head moving in a reciprocating path through said housing opening toward and away from said striking surface;
   d. means for adjusting the closest distance which said plunger can come to said striking surface;
   e. manually engageable means connected to said plunger for reciprocation thereof including an elongated lever arm formed with an opening therethrough for receiving said plunger and formed with a bend along its longitudinal axis in the plane of said plunger and lever arm for ease in opening and closing said valve;
   f. flexible conduit means axially mounted in said passage and passing between said valve seat means and said plunger head so as to be constricted by the movement of said plunger; and
   g. a pin mounted in said opening in the end of said plunger and straddling said lever arm to provide 360° positioning of said lever arm.

2. A valve as described in claim 1 including;
   a. on end of said passage in said housing being threaded with pipe threads;
   b. a rigid conduit having an internally threaded end;
   c. a connecting member externally threaded for mating with said threaded housing passage and said threaded portion of said rigid conduit;
   d. a bushing having an outside diameter greater than the inside diameter of said flexible conduit for forcing said flexible conduit in sealing engagement with the internal walls of said connecting member to prevent corrosive gases from reaching said valve mechanism which may escape at the joinder of said flexible conduit with said rigid conduit; and
   e. a bracket member having an opening therein for receiving said connecting member and openings for attaching said bracket to a table or other object.